United States Patent [19]
Robertson et al.

[11] Patent Number: 5,904,415
[45] Date of Patent: May 18, 1999

[54] FLUORESCENT BULB CONNECTOR ASSEMBLY

[75] Inventors: Roger Robertson; Weldon Wells, both of Carthage; Paul Eckels, Joplin, all of Mo.

[73] Assignee: H. E. Williams, Inc., Carthage, Mo.

[21] Appl. No.: 08/669,941

[22] Filed: Jun. 25, 1996

[51] Int. Cl.[6] .................................................... F21S 3/00
[52] U.S. Cl. ........................ 362/260; 362/217; 362/226; 439/236; 439/242
[58] Field of Search ..................................... 439/236, 237, 439/238, 242–244; 362/217, 220, 221, 226, 260, 457

[56] References Cited

U.S. PATENT DOCUMENTS

| | | | |
|---|---|---|---|
| 2,356,601 | 8/1944 | MacCarthy | 439/236 |
| 3,993,386 | 11/1976 | Rowe | 439/236 |
| 4,084,873 | 4/1978 | Grate | 439/244 |
| 4,758,173 | 7/1988 | Northrop | 439/236 |
| 4,799,134 | 1/1989 | Pinch et al. | 362/217 |
| 4,803,600 | 2/1989 | Pepping | 362/217 |
| 4,994,710 | 2/1991 | Roelevink et al. | 439/236 |

*Primary Examiner*—Alan Cariaso
*Attorney, Agent, or Firm*—Beirne Maynard & Parsons, L.L.P.

[57] ABSTRACT

A connector is provided for securing a fluorescent light bulb having a given length into a lighting fixture having spaced apart bulb-receiving members, with the space between the bulb-receiving members being longer than the length of the bulb. The connector also has fluorescent bulb pin openings at one end which receive a lighting bulb pin or pins at one end and connector pins at the other end of the connector for receipt within a companion opening or slots within the bulb-receiving members of the lighting fixture.

13 Claims, 5 Drawing Sheets

FIG. 5
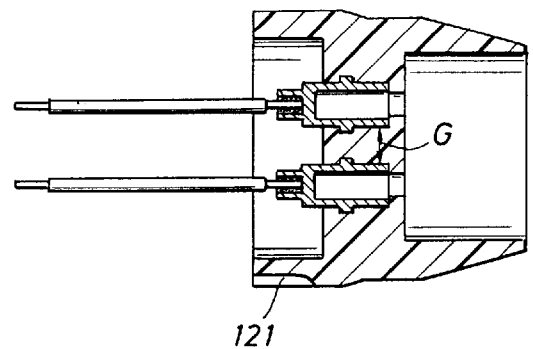
FIG. 4
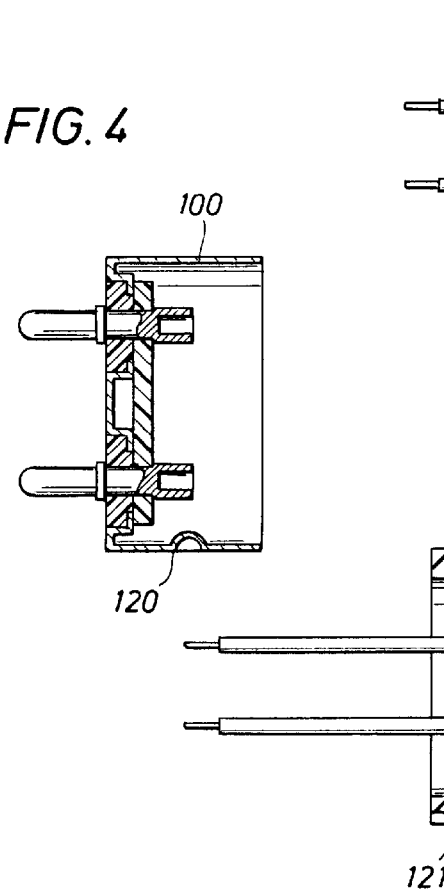
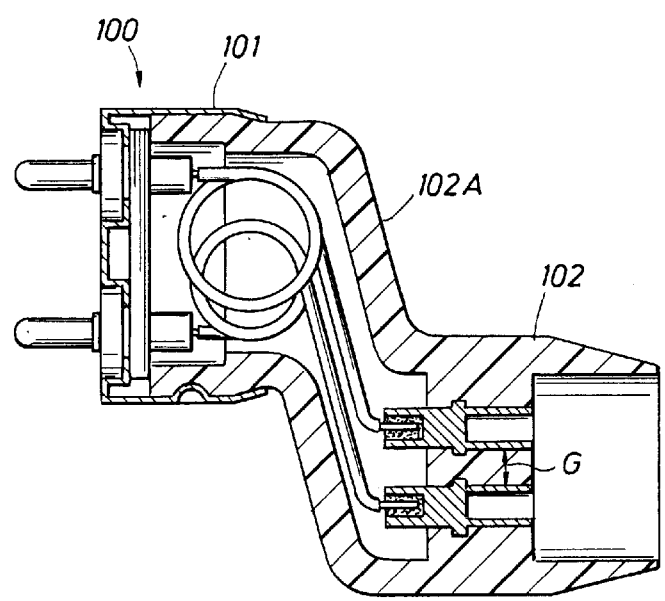
FIG. 6
FIG. 7

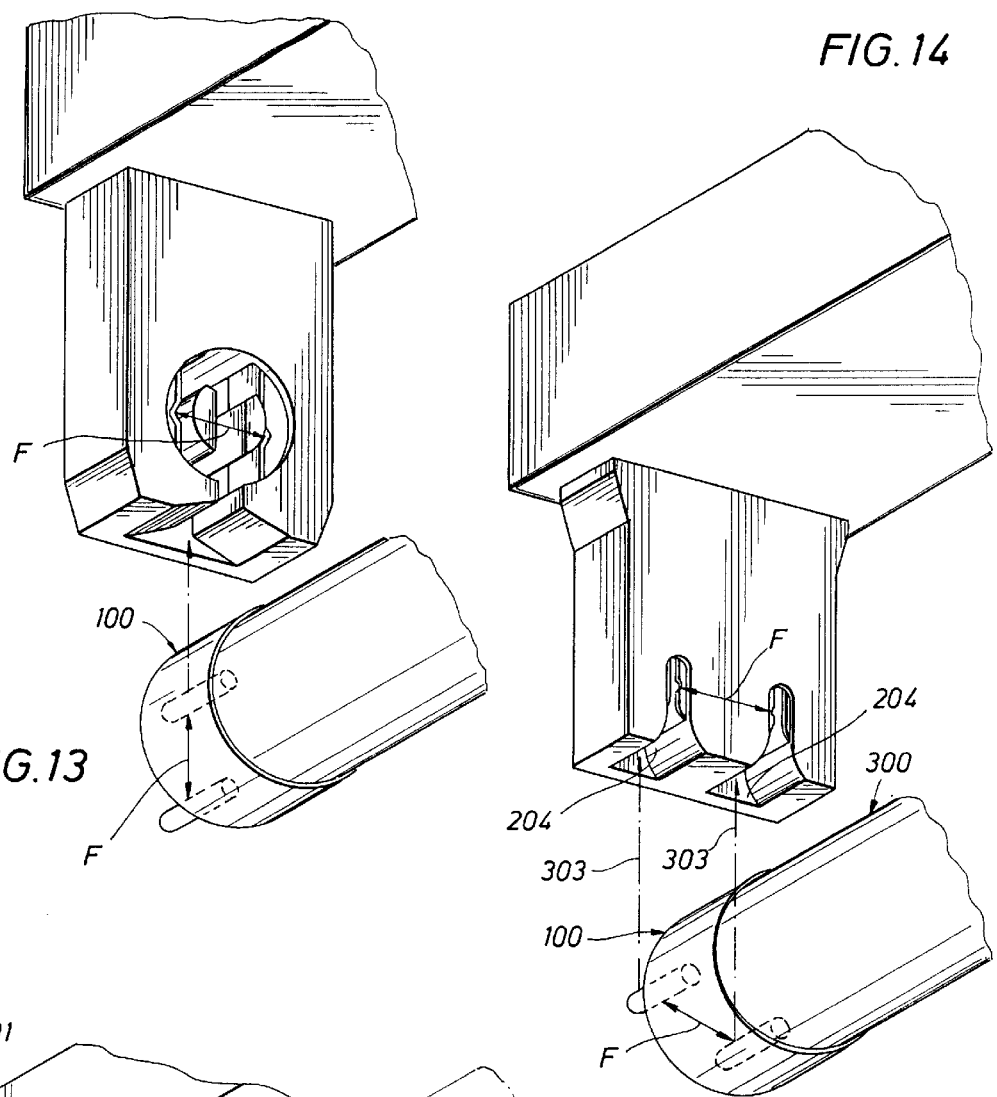
FIG. 14
FIG. 13
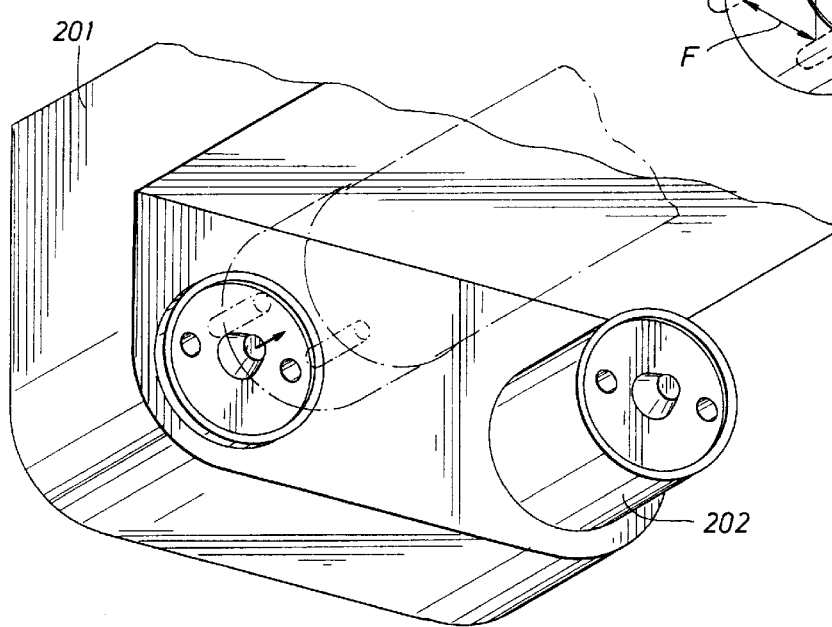
FIG. 15

5,904,415

FLUORESCENT BULB CONNECTOR ASSEMBLY

BACKGROUND OF THE INVENTION (1) Field of the Invention

This invention relates to a connector for effectively extending the length of a fluorescent bulb of a shorter distance than the distance between bulb-receiving members in a lighting fixture, the connector accommodating a given distance between pins of the lighting fixture to convert them to a pin system having a larger length between the two pins in the bulb-receiving member of the housing fixture.

(2) Brief Description of the Prior Art

A fluorescent light bulb is a gas discharge tube whose output of light is so increased by special means that it can be used for lighting purposes. The inner surface of the wall of the tube is coated with a light-emitting substance, usually a fluorescent or phosphorescent metallic salt, such as calcium tongstate, zinc sulphide, or zinc cylocate. The tube is filled with mercury vapor at extremely low pressure. The electrons ejected from the incondensate electrodes will collide with the mercury atoms and cause these to emit radiation which consists, for the most part, of ultraviolet rays which are invisible.

The visible portion of the mercury vapor rays is situated in the green and blue range of the spectrum and gives a pale light. The ultraviolet light strikes a fluorescent substance with which the wall of the tube is coated and causes this substance to emit radiation with the longer wavelength in the visible range of the spectrum, i.e., the coating transforms the invisible rays into visible light.

By suitable choice of the fluorescent substance, this light can be given any desired color. The lamp has to be operated with a starter which prevents a harmful rise in voltage and serves to ignite the lamp. For this purpose, a small auxiliary glow lamp provided with a thermal contact is connected in parallel with the main lamp. When the current is switched on, the glow lamp first lights up (the bi-metallic thermal contact is then open). This causes the bi-metallic strip to warm and close the contact, with the result that the glow lamp is short-circuited and the cathodes of the main lamp receive the full current that makes them incandescent. The bi-metallic strip cools and breaks the contact. By means of the starter, this interruption of the circuit produces a voltage surge which is high enough to initiate the discharge in the fluorescent lamp itself. Because it is by-passed by the main lamp, the small auxiliary lamp then ceases to function. The bi-metallic strip keeps the contact open. The cathodes of the main lamp are kept glowing at white heat by the impigment of positive mercury ions, and the lamp thus continues to function and emit light in the manner set forth above.

The light of a fluorescent lamp is not produced by an incandescent body (such as the filament of an ordinary electric lamp), but is emitted as a result of the excitation of atoms, namely, those of the mercury vapor and the fluorescent coating, and is extremely economical in operation. Because of the large-emitting area, a fluorescent bulb gives a pleasant light which produces only soft shadows.

In the United States, fluorescent light bulbs are provided, typically, in 18 inch, 2 to 6 foot and 8 foot lengths, with the popular lengths being two and four foot lengths. The diameter of the bulb is commercially referred to as a "T" portion, with the portion being defined in increments of 8ths of an inch. A typical United States commercial light bulb will have a diameter that is identified as "T8", i.e., one inch in diameter.

However, in recent years, a smaller diameter fluorescent lamp identified as "T5", or ⅝ of an inch in diameter, has been incorporated into fluorescent lighting fixtures made in Europe for specific accommodation of such T5 fluorescent lamps. Typical of such T5 lamps are those made available by Phillips.

The T5 lamps require less watts of power than do most of the T8 lamps made in the United States. Additionally, the T5 fluorescent lamps are somewhat shorter than conventional T8 fluorescent lamps. Additionally, because of the smaller diameter of the T5 lamps when compared to the diameter of the T8 lamps, the electrical connecting pins at each end of the T5 fluorescent lamp are spaced apart from one another a distance which is smaller than the distance between the comparative pins in the T8 lamps, thus making electrical connection between the T5 lamp and the lighting fixture for receipt of a T8 lamp impossible.

Because of the increased efficiency and lower usage of electrical energy resulting from the design of the T5 lamps, it would be desirable to permit such T5 lamps to be incorporated within lighting fixtures already manufactured and installed which receive T8 lamps. Additionally, lighting fixtures that already have bulb-receiving members for receipt of the T8 fluorescent bulbs will have to be provided with some sort of device for accommodating the highly efficient T5 bulbs in such fixtures without change to the standard T8 bulb-receiving members in the fixtures.

The present invention addresses the problems set forth above.

BRIEF DESCRIPTION OF THE DRAWINGS

FIG. 4 is a cross-sectional view of the connector housing of the present invention showing means for securing the connector housing to a shield selectively secured therein by means of a crimp to the housing surface.

FIG. 5 is a horizontal cross-sectional view of a shield for securement into the connector housing of FIG. 4.

FIG. 6 is an embodiment of an elongated shield member having a crimp receptacle for emplacing the shield into the housing prior to crimping.

FIG. 7 is an illustration of the connector of the present invention proceeding a flexible portion of the shield for offset or rotational alignment of the bulb.

FIGS. 8 through 12 illustrate an embodiment of the invention in which the connector can be provided in separate housing and shield pieces, thus affording use of a standard housing with a shield element that may be provided in any number of lengths with:

FIG. 8 being an exterior side view of the housing showing a radially extending opening around an angled shoulder;

FIG. 9 being a view of the shield assembly looking toward its end with companion slots for receipt within the opening of the housing;

FIG. 10 being an exterior view of the housing showing the opening with slot there around and arresting should for terminating rotation of the shield;

FIG. 11 being a view similar to that of FIG. 9, but showing a view looking across the exterior end of the shield; and FIG. 12 illustrating the locking engagement of the housing and shield elements.

FIG. 13 is a perspective view showing incorporation of the connector with a fluorescent bulb to be used in a lighting fixture having a receiving member of construction somewhat different than that illustrated in FIG. 2.

FIG. 14 is a view similar to FIG. 13 illustrating yet another receiving means configuration of the lighting fixture for acceptance of the connector of the present invention.

FIG. 15 is a view similar to that of FIGS. 13 and 14, illustrating yet another design of a known bulb-receiving means which is spring biased outwardly to assist in aligning the bulb with the connector of the present invention within the lighting fixture.

SUMMARY OF THE INVENTION

Figure 1:
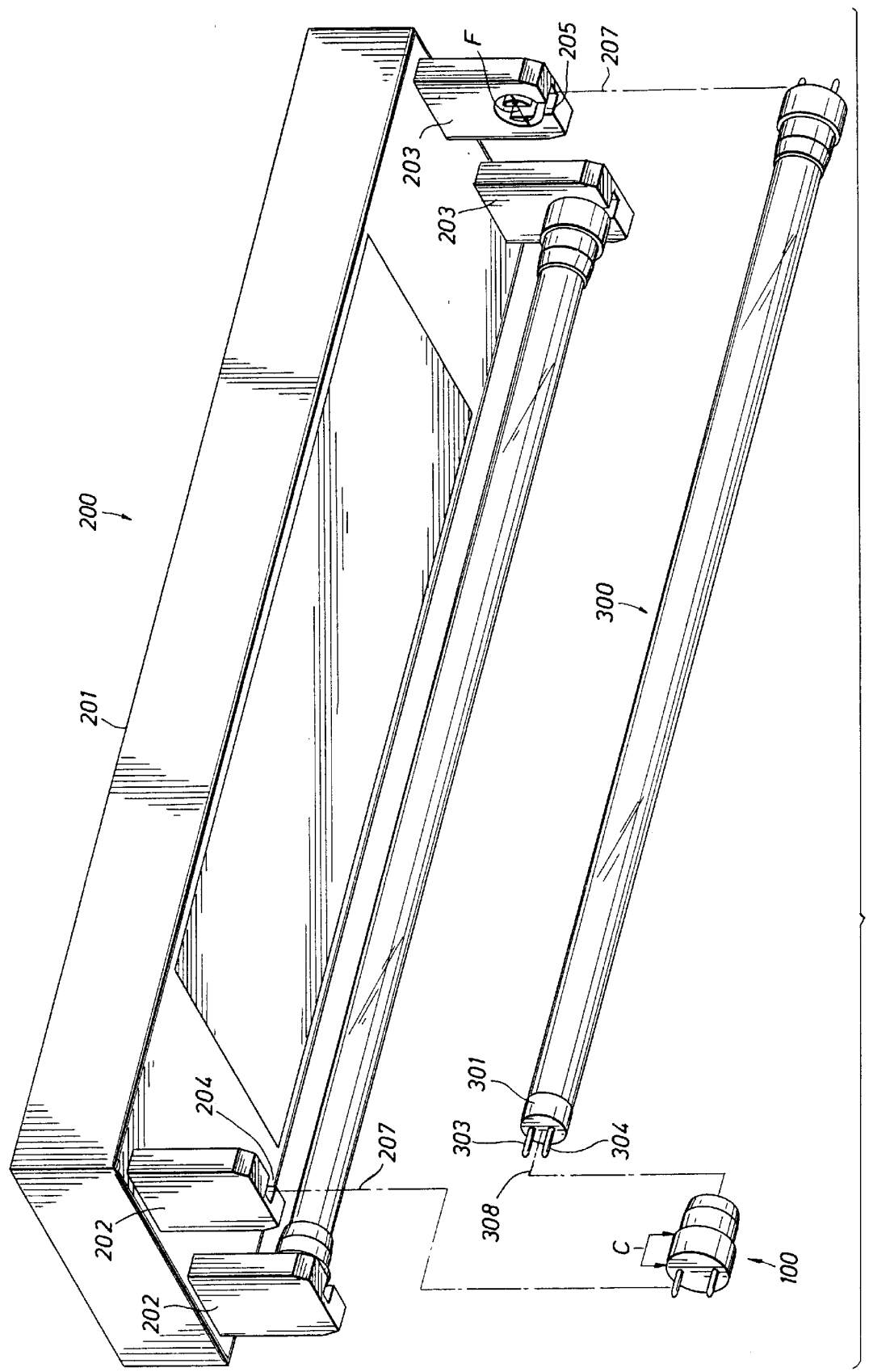
FIG. 1 is perspective view of a lighting fixture adapted to receive a plurality of T8 bulbs using the connector of the present invention for permitting fitting of the T5 bulb into the T8 lighting fixture bulb-receiving members.

The invention includes a connector having a housing of a given length for converting a fluorescent light bulb having a given length and further having first and second end members. The end members each have electrically positive and negative pin elements which are spaced apart from one another a first pin distance for selective engagement of the light bulb into a lighting fixture. The lighting fixture includes first and second bulb receiving members, with each of the first and second bulb receiving members having companion openings, or an opening, and spaced apart a second opening distance which is larger than the first bulb pin distance. The distance between the bulb-receiving members is longer than the given length of the fluorescent light bulb. The invention further contemplates use of a connector for bulbs having a coaxial positive and negative pin or connector configuration. The invention also contemplates use of a connector for a pin configuration where the positive and negative pins are disposed on opposite ends of the bulb, and functionally similar arrangements.

The connector comprises a housing with an elongated shield secured by the housing. The function of the shield is to receive and encapulate an end of the bulb. The shield includes an opening for receipt of one of the ends of the bulb and further includes first and second bulb pin contacts. Positive and negative connector pin are provided with each extending away from the housing and the bulb. Each of the connector pins are selectively engageable within one of the first and second bulb receiving members of the lighting fixture. The length of the connector housing and the length of the bulb are substantially equal to the distance between the lighting fixture bulb-receiving member.

Additionally, the invention contemplates the connector being provided in a standardized housing design with the shield being selectively securable thereto, such that a standardized connector housing may be used with any given number of shields which provide selected lengths for accommodation of various lengths of fluorescent bulbs to a particular lighting fixture, such as a T8 lighting fixture.

The connector may also be provided in a design in which a fluorescent bulb may be radially or horizontally offset from the bulb-receiving fixtures of the lighting fixture.

A method of retro-fitting a lighting fixture for receipt of a fluorescent bulb and the connectors is also described, as well as a method of fitting the fluorescent bulb initially into the lighting fixture.

The invention also contemplates the use of a plurality of connectors such that the bulb may be provided equaldistantly between the bulb receiving member in the light fixture. Additionally, the connectors may be provided in combination with the bulb for easy, immediate insert into the lighting fixture. The invention also contemplates a lighting fixture assembly, including the smaller fluorescent bulb and the connectors.

DESCRIPTION OF THE PREFERRED EMBODIMENTS

Now with reference to FIG. 1, there is shown the connector 100, the lighting fixture 200, and the fluorescent light bulb 300.

Figure 2:
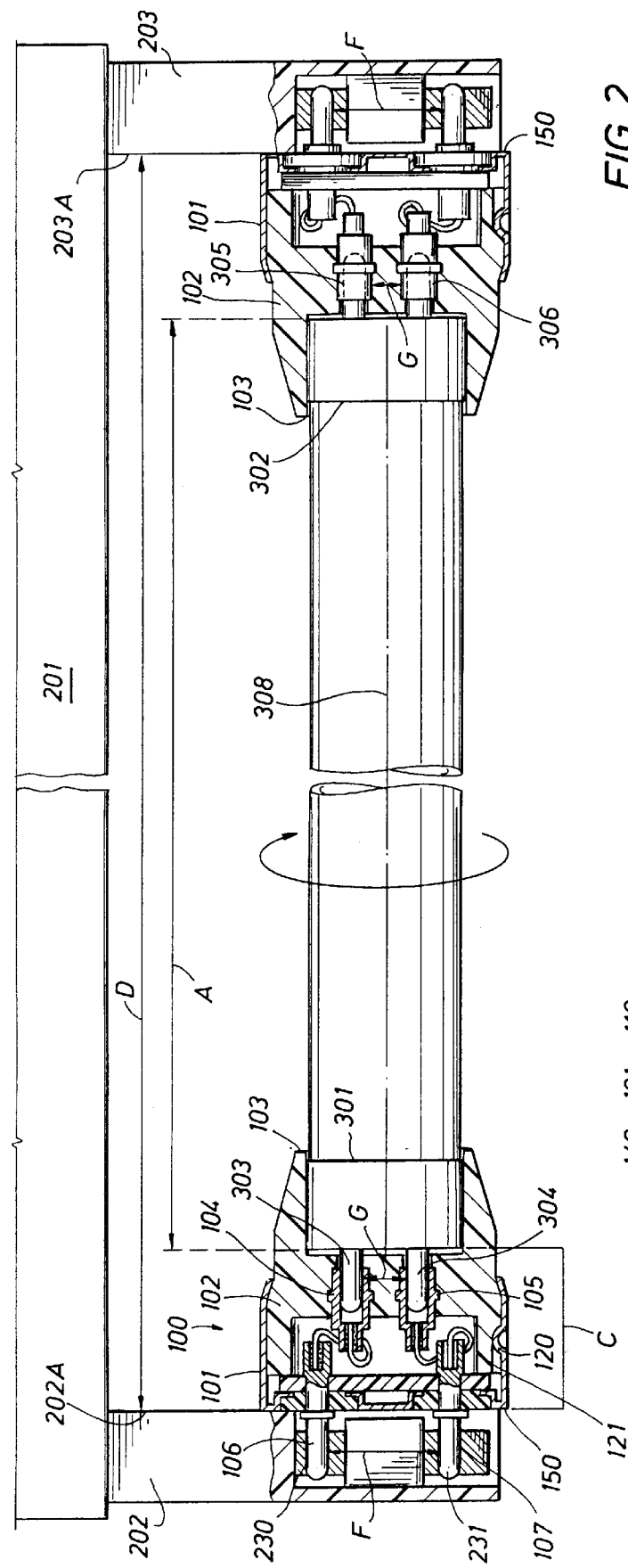
FIG. 2 is a view similar to that of FIG. 1, but showing the connectors in cross-sectional views with the T5 bulb affixed therein.

The fluorescent light bulb 300 has end members 301 and 302 (FIG. 2) at each end thereof. Positive and negative electrical pins 303 and 304 are illustrated as disposed within the end members 301 and 302. The bulb 300 also has a horizontal centerline defined as line 308 (FIG. 2). The bulb also has a length "A" which is defined as the length between the shoulders 102a of the shields 102.

The lighting fixture 200 is shown in FIGS. 1 and 2 and is defined by housing 201 having first bulb receiving members 202 at one end thereof and second bulb receiving members 203 at the opposite end thereof. The distance between the members 202 and 203 is defined by the line "D", which is the inner walls 202A and 203A. Openings 204 and 205 are provided within the first bulb receiving member 202 and the second bulb receiving member 203, respectively. Each of the openings 204, 205 have a distance there across which is defined by the distance "F" and a centerline therein defined as line 207.

Figure 3:
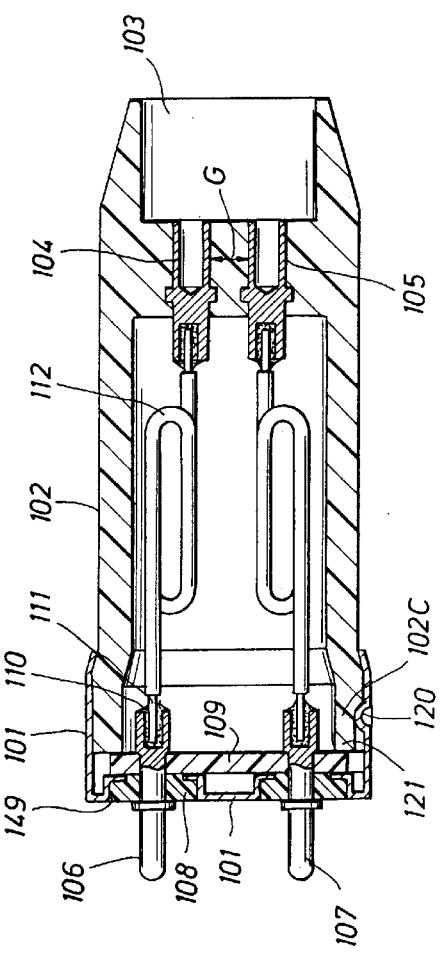
FIG. 3 is a cross-sectional view of the connector of the present invention depicting selective length features of the combination housing and shield of the connector.

Now, with particular reference to FIGS. 2 and 3, the connector 100 includes a housing 101 and a elongated shield 102 secured by the housing, such as shown in FIGS. 2 and 3 as being within the housing and secured there between by means of the crimp 120 being inplaced relative to a crimp receptacle 121 defined exteriorally and partially around and immediate the dorsal end 102C of the elongated shield 102. This securement is shown in enlargement in FIGS. 4 and 6. The connector has a length "C" defined as the distance between the shoulder 102A and the dorsal end 150 of the housing 101.

The shield 102 has at its distal end an opening 103 through which the fluorescent bulb 300 end 301 is snugly engaged.

Each of the pins 303, 304 of the fluorescent bulb 300 on the exterior of the receptacle 301 are received within pin receptacles 104, 105, respectively, in the elongated shield 102. As mentioned, the distance between the pins 303, 304 is measured by the distance defined by the line "G".

The connector 100 also includes positive and negative pins 106, 107 received within a circularly extending contact 230, 231 within the receptacles 202 of the lighting fixture 200. The distance between the two contacts 230, 231 is defined by the line F which also is the line substantially defining the distance between the two pins 106, 107 of the connector 100. Accordingly, as illustrated in FIG. 2, the distance G between the pins 303 and 304 of the fluorescent bulb 300 is considerably smaller or shorter than the distance F between the contacts 230, 231 in the receptacles 202, 203 of the lighting fixture, as well as the distance F between the pins 106 and 107. As shown on the right hand side of FIG. 2, the distance F is the distance between the contacts 230 and 231 within the lamp fixture receptacles 202 and 203 with distance F also substantially being the distance between the pins 106, 107 of the connector 100.

Now referring to FIG. 3, an insulator 108 is provided around a bore 149 therefore within the housing 101. An electrical carrying conduit or contact 111 is disposed within the pins 106, 107 and secured thereto by means of epoxy 110, or other known securing means. If a line 111 is used, a plastic or other cover 112 will typically be secured exteriorally around the line 111 within the shield 102.

Now referring to FIGS. 4, 5, and 6, there is illustrated a connector 100 provided by a separate housing 100 and the shield 101 which may be provided in a first length, such as shown in FIG. 5, as well as in a second length, such as shown in FIG. 6 with the shields of FIG. 5 and FIG. 6 being selectively insertable relative to the housing 100 shown in FIG. 4.

The line or contacts 111 may be electrically connected to the pins 106, 107 by moving the line 111 through the interior of the pins engaging them within such pins, at a line 111 designated length. Alternatively, the lines 111 within the shield 102 as shown in FIG. 6 may simply be provided with contact points secured to the dorsal end 102C of the shield 102, in known manner. The crimp receptacle 121 which is only partially radially disposed around the exterior of the shield 102 (FIGS. 5 and 6) is interiorally disposed within the housing 100 and secured thereto by merely rotating the crimp receptacle 101 to the crimp 120 so that the positive and negative lines 111 are oriented correctly relative to the pins 106, 107.

Now, with reference to FIG. 7, the connector 100 is shown with the housing 101 receiving the shield element and connected thereto as shown in FIGS. 4 and 5, with the shield having a portion 102a that is vertically or radially offset relative to the housing 101 and the shield 2 so that the bulb 300 may be offset radially or laterally relative to the centerline 308 of the bulb and centerline 207 of the bulb-receiving members.

The housing member 101 typically may be made of a metallic substance, but, of course, may be made of a heat resistant plastic. Likewise, the shield may be made of the same plastic or other material, or it may be made of any other known thermal resistant substance capable of providing a good receptacle surface for receipt of the lighting bulb 300.

Figure 8:
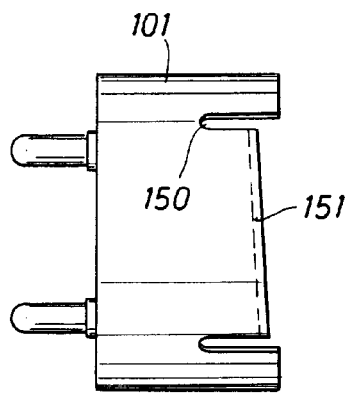
Figure 9:
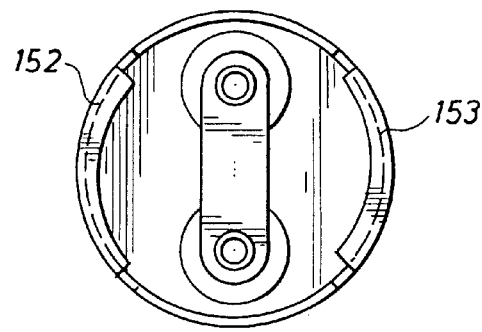
Figure 11:
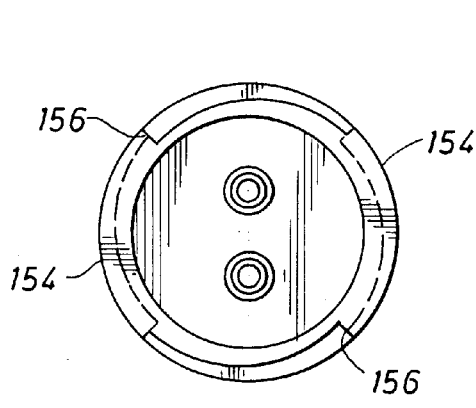
Figure 10:
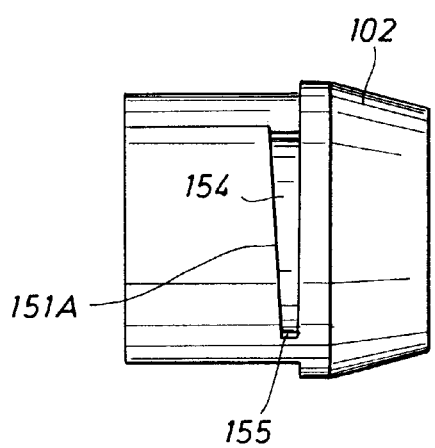
Figure 12:
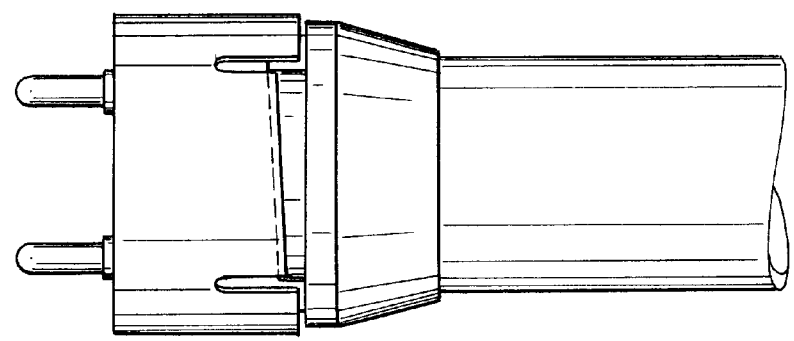

Now referring to FIGS. 8 through 12, there is shown yet another means for securing a housing member 101 and the shield member 102 to provide the connector 100 of the present invention. As shown in FIG. 8, housing 101 has a radially extending opening 150 having an angled shoulder defined by the line 151 thereon. The end of the shield 102 received within the connector 101 as shown in FIG. 9 having first and second slots 152, 153 therein. Each of the slots 152, 153 have a companion slot 154 (FIG. 11 and FIG. 10) with a stop shoulder 155 at the smaller end defined by the angle line 151a. When the shield 102 is appropriately and correctly inserted within the housing member 101, the shoulder 155 interface with the stop 156 disposed at each of the smaller ends of the angled line 151a of the respective slots 154 will prevent the shoulder 155 from further rotational travel. Accordingly, the shield 102 will be securely fitted within the housing 101 so that the pins 106, 107 are in line with the companion positive and negative contacts disposed at the end face of the shield 102 as shown in FIG. 9. The connection now is as shown in FIG. 12.

The lighting fixture 200 may be retrofitted with the bulb 300 by first removing in known fashion the larger or conventional bulb (not shown) and securing at least one end of the bulb 300 to a connector 100 having a shield 102 of appropriate length for retrofit into the lighting fixture 200. The connector 100 is snugly engaged to the bulb 300 for proper orientation of the pins 303, 304 therein, and the combination connector 100 and bulb 300 are simply secured within each of the bulb receiving members 202, 203, in known fashion.

In order to secure the bulb 300 within the lighting fixture 200 such that the bulb 300 is aligned within the lighting fixture 200 equidistantly between the bulb-receiving members 202 and 203, a plurality of connectors 100 having equal length shield elements 102 should be utilized. On the other hand, if it makes no difference whether the bulb 300 is secured within the lighting fixture 200 equal-distantly between the first bulb-receiving members 202 and the second bulb-receiving members 203, connectors 100 may be used with each having a different length of shield.

Likewise, if a combination connector 100 and a bulb 300 assembly is to be utilized to manufacture a combined lighting fixture 200, connector 100, and bulb 300, bulb 300 is simply secured with the connector 100 at each end thereof and engaged in known fashion with the lighting fixture 200. Additionally, the lighting fixture 200 may be manufactured with the connector 100 disposed within the first and second bulb receiving members 202, 203, and shipped to the field. Thereafter, after the lighting fixture 200 is installed in or on a ceiling or wall (not shown), the connectors 100 simply may be hand-manipulated out of the receiving members 202, 203, and affixed to the bulb 300, as above, with the bulb 300/connector 100 assembly reinserted by hand-manipulation of the assembly through rotation, such as shown in the direction as shown by the arrow in FIG. 2, into securement with the receiving members 202, 203.

It is contemplated that the horizontal or radial orientation of the connector 100 relative to the bulb 300, as shown in FIG. 7, may be provided by means of a comparatively soft but heat resistant elastomer or other material known to those skilled in the lighting fixture art to provide shield member 102, which may be simply hand-pressed into appropriate configuration within the housing 100, or the housing 100 and shield 102 may be provided with a pre-oriented shield portion 102a of any number of selectable orientation configurations for offsetting purposes.

The present invention contemplates usage of the connector 100 within a number of known and commercially available designs of bulb receiving members 202, 203 of the lighting fixture 200, as shown in FIGS. 13, 14, and 15.

It will be appreciated that the pins 303 and 304 can be provided as a single pin means on each end of the bulb 300 or in a coaxial-like configuration where, for example, pins 303 and 305 are disposed on each end of lamp 300 either extending out of the ends 150 of the bulb 300 at the centerline 308 or offset, somewhat, from 308, pins 303 (FIG. 1) and 305 are shown (FIG. 2). Likewise, the connector 100 will have only one pin receptacle 104, 105 in actual use and for receipt of the pin 303 or 304. The respective lines 112 may be coaxially or otherwise provided for positive/negative electrical connection relative to each of the pins or contacts 106, 107.

Although the invention has been described in terms of specified embodiment which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A connector for connecting a fluorescent light bulb into a lighting fixture housing, said bulb having a given length and further having first and second end members each having electrically positive and negative bulb pins spaced apart from one another a given bulb pin distance for engagement of said light bulb into said connector, said lighting fixture having first and second bulb-receiving members, each of said first and second bulb-receiving members having means for receipt of pins, the means for receipt of pins in each of the bulb-receiving members being spaced apart a receiving distance larger than the given bulb pin distance, the distance between said bulb-receiving members being longer than the given length of the fluorescent light bulb, said connector comprising:

(a) a housing having distal and dorsal ends;
   (b) an elongated shield secured by and extending distally away from said housing; said shield including an opening for receipt of one of the ends of the bulb, and further including first and second bulb pin contacts; and
   (c) positive and negative connector pins extending dorsally away from said housing and said bulb, said connector pins being selectively engageable within one of the first and second bulb-receiving members of said lighting fixture; the length of the connector housing, and the length of the bulb being substantially equal to the distance between the lighting fixture bulb-receiving members, the distance between the connector pins and the distance between the means for receipt of pins being substantially equal and larger than the distance between the bulb pins.

2. A connector assembly for connecting a fluorescent light bulb into a lighting fixture housing, said bulb having a given length and further having first and second end members each having electrically positive and negative bulb pins spaced apart from one another a given bulb pin distance, for selective engagement of said light bulb into said connector, said lighting fixture having first and second bulb-receiving members, each of said first and second bulb-receiving members having means for receipt of pins, the means for receipt of pins in each of the bulb-receiving members being spaced apart a receiving distance larger than the given bulb pin distance, the distance between said bulb-receiving members being longer than the given length of the fluorescent light bulb, said connector assembly including first and second connectors each having lengths, each connector comprising:

(a) a housing having distal and dorsal ends;
   (b) a elongated shield secured by and extending distally away from said housing, said shield including an opening for receipt of one of the ends of the bulb and further including first and second bulb pin contacts; and
   (c) positive and negative connector pins extending dorsally away from said housing and said bulb, said connector pins being selectively engageable within one of the first and second bulb-receiving members of said lighting fixture; the total length of each connector housing and the length of the bulb being substantially equal to the distance between the lighting fixture bulb-receiving members, the distance between the connector pins of the connectors and the distance between the means for receipt of said pins being substantially equal and larger than the distance between the bulb pins.

3. The connector assembly of claim 2 wherein the length of each of the connector housing is substantially equal whereby the fluorescent light bulb may be secured equidistantly between each of the bulb-receiving members.

4. A combination fluorescent light bulb and connector assembly for connecting the fluorescent bulb into a lighting fixture housing, comprising:

(a) a fluorescent light bulb having a given length and further having first and second end members each having electrically positive and negative bulb pins spaced apart from one another a given bulb pin distance, for selective engagement of the light bulb into the lighting fixture housing, said housing having first and second bulb-receiving members, each of said first and second bulb-receiving members having means for receipt of connector pins, the means for receipt of connector pins in each of the bulb-receiving members being spaced apart a receiving distance larger than the given bulb pin distance, the distance between said bulb-receiving members being longer than the given length of the fluorescent light bulb; and
   (b) at least one connector member, said connector member comprising:
      (1) a housing of a given length and having distal and dorsal ends;
      (2) an elongated shield secured by and extending distally away from said housing, said shield including an opening for receipt of one of the ends of the bulb and further including first and second bulb pin contacts; and
      (3) positive and negative connector pins extending dorsally away from said housing and said bulb, said connector pins being selectively engageable within one of the first and second bulb-receiving members of said lighting fixture; the given length of the connector housing(s) and the length of the bulb being substantially equal to the distance between the lighting fixture bulb-receiving members, the distance between the connector pins and the distance between the means for receipt of said pins being substantially equal and larger than the distance between the bulb pins.

5. A fluorescent lighting fixture assembly including:

(a) a fluorescent light bulb having a given length and further having first and second end members each having electrically positive and negative bulb pins spaced apart from one another a given bulb pin distance for selective engagement of said light bulb into a connector member of a connector assembly;
   (b) first and second lighting fixture housing bulb-receiving members, each of said first and second bulb-receiving members having means for receipt of connector pins, said means for receipt of said connector pins being spaced apart a receiving distance larger than the given bulb pin distance, the distance between said bulb-receiving members being longer than the given length of the fluorescent light bulb; and
   (c) a connector comprising:
      (1) a housing having distal and dorsal ends;
      (2) an elongated shield secured by and extending distally away from said housing, said shield including an opening for receipt of one of the ends of the bulb and further including first and second bulb pin contacts; and
      (3) positive and negative connector pins extending dorsally away from said housing and said bulb, said connector pins being selectively engageable within one of the first and second bulb-receiving members of said lighting fixture; the length of the connector housing and the length of the bulb being substantially equal to the distance between the lighting fixture bulb-receiving members, the distance between the connector pins and the distance between the means for receipt of said connector pins being substantially equal and larger than the distance between the bulb pins.

6. A fluorescent lighting fixture assembly including:

(a) a fluorescent light bulb having a given length and further having first and second end members, each having electrically positive and negative pins spaced apart from one another a given bulb pin distance for selective engagement of said light bulb into a connector member of a connector assembly;

(b) first and second lighting fixture housing bulb-receiving members, each of said first and second bulb-receiving members having means for receipt of connector pins, said means for receipt of connector pins being spaced apart a distance larger than the given bulb pin distance, the distance between said bulb-receiving members being longer than the given length of the fluorescent light bulb; and (c) first and second connector members, each of the connector members having a given length, each said connector member comprising:

(1) a housing having distal and dorsal ends;

(2) an elongated shield secured by and extending distally away from said housing, said shield including an opening for receipt of one of the ends of the bulb and further including first and second bulb pin contacts; and (3) positive and negative connector pins extending dorsally away from said housing and said bulb, said connector pins being selectively engageable within one of the first and second bulb-receiving members of said lighting fixture; the total length of each of the connector members and the given length of the bulb being substantially equal to the distance between the lighting fixture bulb-receiving members, the distance between the connector pins of each member and the distance between the means for receipt of pins being substantially equal and larger than the distance between the bulb pins.

7. A fluorescent lighting fixture assembly including:

(a) a light fixture housing (b) a fluorescent light bulb having a given length and further having first and second end members, each having electrically positive and negative bulb pins spaced apart from one another a bulb pin distance for selective engagement of said light bulb into the lighting fixture housing;

(c) first and second lighting fixture housing bulb-receiving members, each of said first and second housing bulb-receiving members having means for receipt of said connector pins, the means for receipt of said pins being spaced apart a receiving distance larger than the given bulb pin distance, the distance between said housing bulb-receiving members being longer than the given length of the fluorescent light bulb; and (d) first and second connectors each of said connectors comprising:

(1) a housing having distal and dorsal ends;

(2) an elongated shield secured by and extending from said housing, away from said shield including an opening for receipt of one of the ends of the bulb and further including first and second bulb pin contacts the shield of each connector being equal in length; and (3) positive and negative connector pins extending dorsally away from said connector housing and said bulb, said connector pins being selectively engageable within one of the first and second bulb-receiving members of said lighting fixture housing; the length of each of the connector housings and the length of the bulb being substantially equal to the distance between the lighting fixture bulb-receiving members, the distance between the connector pins and the distance between the means for receipt of said connector housing pins being substantially equal and larger than the distance between the bulb pins whereby the fluorescent light bulb is placed equidistantly between the lighting fixture bulb-receiving members.

8. A connector of a given length for connecting a fluorescent light bulb having a given length and a centerline, and further having first and second end members each having electrically positive and negative bulb pins spaced apart from one another a bulb pin distance for selective engagement of said light bulb into a lighting fixture including first and second bulb-receiving members, each of said first and second bulb-receiving members having means for receipt of connector pins, said means for receipt of said connector pins in each of the bulb-receiving members being spaced apart a receiving distance larger than the given bulb pin distance, the distance between said bulb-receiving members being longer than the given length of the fluorescent light bulb, said connector comprising:

(a) a housing having distal and dorsal ends;

(b) an elongated shield secured by and extending distally away from said housing and having means on a portion thereof for selectively offsetting from the centerline of said fluorescent light bulb, said shield including an opening for receipt of one of the ends of the bulb, and further including first and second bulb pin contacts; and (c) positive and negative connector pin extending dorsally away from said housing and said bulb, said connector pins being selectively engageable within one of the first and second bulb-receiving members of said lighting fixture; the length of the connector housing and the length of the bulb being substantially equal to the distance between the lighting fixture bulb-receiving members, at least one of said connector pins being offset from the centerline of the fluorescent light bulb, whereby the offset of at least one of the shield and the connector pins extending away from said housing permits the fluorescent light bulb to be secured by the connector within the lighting fixtures such that the centerline of the bulb is offset radially or horizontally from each of the first and second bulb-receiving members, the distance between the connector pins and the distance between the means for receipt of said connector pins being substantially equal and larger than the distance between the bulb pins.

9. A connector of a given connector length for connecting a fluorescent light bulb having a given bulb length, said bulb further having first and second end members each having electrically positive and negative pins spaced apart from one another a first bulb pin distance for engagement of said light bulb into said connector, said connector extendable into a lighting fixture housing, including first and second housing-receiving members, each of said first and second housing-receiving members having companion openings, the openings in each of the housing-receiving members being spaced apart a second opening distance larger than the first bulb pin distance, the distance between said bulb-receiving members being longer than the given length of the fluorescent light bulb, said connector comprising:

(a) a housing;

(b) an elongated shield selectively securable relative to said housing; said shield including an opening for receipt of one of the ends of the bulb, and further including first and second bulb pin contacts;

(c) means for selectively securing said shield to said housing; and (d) positive and negative connector pins extending away from said housing and said bulb, each of said connector pins being selectively engageable within one of the first and second housing-receiving members of said lighting fixture, the length of the connector housing and the length of the bulb being substantially equal to the distance between the lighting fixture housing-receiving members.

10. The connector of claim 9 wherein said means for selectively securing said shield to said housing includes an opening delivered around said housing and an angled shoulder delivered interiorly around said opening, and a series of slots around the shield for companion receipt within said connector housing opening, said shield slots defining an angle with a terminating should for no-go contact with companion slots terminating the openings defined around said housing.

11. The device of claims 1, 2, 3, 4, 5, 6, 7, 8, 9, or 10 wherein at least one of the first and second bulb-receiving members is spring biased outwardly beyond the distance between the bulb-receiving members.

12. A method of retrofitting a fluorescent light bulb into a lighting fixture housing, comprising the steps of:

(a) removing from said lighting fixture housing a first fluorescent light bulb;

(b) providing a second fluorescent light bulb having a given length and further having first and second end members each having electrically positive and negative bulb pins spaced apart from one another a given bulb pin distance;

(c) affixing to each end of said second fluorescent light bulb a connector comprising:

(1) housing having distal and dorsal ends;

(2) an elongated shield secured by and extending away from said housing; said shield including an opening for receipt of one of the ends of the second bulb, and further including first and second bulb pin contacts; and (3) positive and negative connector pins extending dorsally away from said housing and said bulb, said connector pins being selectively engageable within one of the first and second bulb-receiving members of said lighting fixture; the length of the connector housing and the length of the second bulb being substantially equal to the distance between the lighting fixture bulb-receiving members, the distance between the connector pins and the distance between the means for receipt of pins being substantially equal and larger than the distance between the bulb pins;

(d) affixing the second fluorescent light bulb onto each of the connectors through the shield opening and moving said bulb into each of said connectors such that the bulb pins are in electric communication relative to the bulb pin contacts; and (e) placing the positive and negative connector pins through the bulb-receiving members.

13. A method of assembling a fluorescent lighting fixture assembly, comprising the steps of:

(a) providing a fluorescent light bulb having a given length and further having first and second end members, each end member having electrically positive and negative bulb pins spaced apart from one another a given bulb pin distance;

(b) providing a lighting fixture having first and second lighting fixture housing bulb-receiving members, each of the first and second bulb-receiving members having means for receipt of connector pins, said means for receipt of said connector pins being spaced apart a receiving distance larger than the given bulb pin distance, the distance between the bulb-receiving members being longer than the given length of the fluorescent light bulb;

(c) providing a connector comprising:

(1) a housing having distal and dorsal ends;

(2) an elongated shield secured by and extending distally away from said housing, said shield including an opening for receipt of one of the ends of the bulb and further including first and second bulb pin contacts;

(3) positive and negative connector pins extending dorsally away from said housing and said bulb, said connector pins being selectively engageable within one of the first and second bulb-receiving members of said lighting fixture; the length of the connector housing and the length of the bulb being substantially equal to the distance between the lighting fixture bulb-receiving members, the distance between the connector pins and the distance between the means for receipt of said connector pins being substantially equal and larger than the distance between the bulb pins;

(d) securing a connector to each end of the fluorescent bulb;

(e) introducing one of the connectors with the bulb affixed therein into one of the first and second bulb-receiving members; and (f) securing the other of the connectors and the bulb into the other of the first and second bulb-receiving members.

\* \* \* \* \*